US009455091B2

(12) United States Patent
Miyazaki et al.

(10) Patent No.: US 9,455,091 B2
(45) Date of Patent: Sep. 27, 2016

(54) ELECTRIC STORAGE DEVICE

(71) Applicant: GS Yuasa International Ltd., Kyoto-shi, Kyoto (JP)

(72) Inventors: Akihiko Miyazaki, Kyoto (JP); Sumio Mori, Kyoto (JP); Tomonori Kako, Kyoto (JP); Kenta Nakai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 193 days.

(21) Appl. No.: 14/497,781

(22) Filed: Sep. 26, 2014

(65) Prior Publication Data

US 2015/0092320 A1 Apr. 2, 2015

(30) Foreign Application Priority Data

Sep. 30, 2013 (JP) ................................. 2013-205601
Sep. 10, 2014 (JP) ................................. 2014-184624

(51) Int. Cl.
*H01G 9/042* (2006.01)
*H01G 9/15* (2006.01)
(Continued)

(52) U.S. Cl.
CPC ............ *H01G 9/042* (2013.01); *H01G 9/0425* (2013.01); *H01G 9/15* (2013.01); *H01M 4/505* (2013.01); *H01M 4/525* (2013.01); *H01M 4/667* (2013.01);
(Continued)

(58) Field of Classification Search
CPC ...... H01G 11/86; H01G 11/26; H01G 11/38; H01G 11/58; H01G 11/84; H01G 9/042; H01G 11/04; H01G 11/06; H01G 11/50; H01G 11/56; H01G 11/46; H01G 11/68; H01G 11/70; H01G 9/0029; H01G 9/048; H01G 11/30; H01G 11/66; H01G 9/145; H01G 11/22; H01G 11/72; H01G 9/038; H01G 9/0425; H01G 9/058; H01G 9/2045
See application file for complete search history.

(56) References Cited

U.S. PATENT DOCUMENTS 8,537,525 B2   9/2013   Sannan
8,663,845 B2   3/2014   Ohmori
(Continued)

FOREIGN PATENT DOCUMENTS

EP   1487038 A2   12/2004
EP   2592674 A1   5/2013
(Continued)

OTHER PUBLICATIONS

Extended European Search Report dated Mar. 19, 2015 issued in the corresponding European patent application No. 14186611.1.

*Primary Examiner* — Dion R Ferguson
(74) *Attorney, Agent, or Firm* — Rankin, Hill & Clark LLP

(57) ABSTRACT

An electric storage device having a positive electrode, a negative electrode, a separator located between the positive electrode and the negative electrode, and a nonaqueous electrolyte. The positive electrode has a positive substrate layer, a positive composite layer containing a positive active material, and an undercoat layer located between the positive substrate layer and the positive composite layer. A density of the positive composite layer is 2.1 g/cm$^3$ or more and 2.7 g/cm$^3$ or less. The positive electrode has the rate of increase in sheet resistance after a solvent immersion test of 30% or less. The undercoat layer contains a binder selected from the group consisting of chitosan derivatives, cellulose derivatives and acrylic acid derivatives.

7 Claims, 9 Drawing Sheets

(51) Int. Cl.
*H01M 4/505* (2010.01)
*H01M 4/525* (2010.01)
*H01M 4/66* (2006.01)
*H01M 10/0525* (2010.01)
*H01M 4/02* (2006.01)

(52) U.S. Cl.
CPC ... *H01M 10/0525* (2013.01); *H01M 2004/021* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 2011/0091771 A1* | 4/2011 | Sannan | C09D 5/002 429/217 |
| 2011/0159364 A1 | 6/2011 | Nishinaka | |
| 2011/0274971 A1 | 11/2011 | Sakamoto | |
| 2012/0015237 A1 | 1/2012 | Cha | |
| 2013/0089781 A1 | 4/2013 | Yamafuku | |
| 2013/0157129 A1* | 6/2013 | Uemura | C09D 5/24 429/211 |
| 2013/0224590 A1* | 8/2013 | Divigalpitiya | H01G 9/045 429/211 |
| 2013/0320271 A1 | 12/2013 | Sannan | |
| 2014/0114519 A1* | 4/2014 | Iwama | H01M 4/485 701/22 |
| 2014/0127574 A1 | 5/2014 | Ohmori | |

FOREIGN PATENT DOCUMENTS

| | | |
|---|---|---|
| JP | 2001319695 A2 | 11/2001 |
| JP | 2003272611 A2 | 9/2003 |
| JP | 2006286344 A2 | 10/2006 |
| JP | 2007258087 A2 | 10/2007 |
| JP | 2008060060 A2 | 3/2008 |
| JP | 2008108649 A2 | 5/2008 |
| JP | 2009277660 A2 | 11/2009 |
| JP | 2010135338 A2 | 6/2010 |
| JP | 2011034893 A2 | 2/2011 |
| JP | 2011138693 A2 | 7/2011 |
| JP | 2012023005 A2 | 2/2012 |
| JP | 2012048892 A2 | 3/2012 |
| WO | 2010084669 A1 | 7/2010 |
| WO | 2012005301 A1 | 1/2012 |

* cited by examiner

ELECTRIC STORAGE DEVICE

CROSS-REFERENCE TO RELATED APPLICATIONS

This application is based on Japanese Patent Applications No. 2013-205601 filed on Sep. 30, 2013, and 2014-184624 filed on Sep. 10, 2014, the entire contents of which are hereby incorporated by reference.

FIELD

The present invention relates to an electric storage device having a positive electrode, a negative electrode, a separator located between the positive electrode and the negative electrode, and a nonaqueous electrolyte.

BACKGROUND

To solve global environmental problems, it becomes important to shift from gasoline vehicles to electric vehicles. Therefore, development of an electric vehicle using an electric storage device such as a lithium ion secondary battery as a power source has been promoted. In such an electric storage device, it is important to increase a power. Therefore, conventionally, an electric storage device in which a power is increased by increasing a positive composite density is proposed (e.g., refer to JP-A-2003-272611).

SUMMARY

However, in the configuration of arranging an undercoat layer on the positive electrode in the conventional electric storage devices, a power cannot be increased in some cases. That is, in the electric storage device in which the undercoat layer is arranged on the positive electrode, a power retention may be reduced due to deterioration by use in some case even when the positive composite density is increased. In this case, a power cannot be increased after deterioration.

The present invention was made in order to solve the above-mentioned difficulty, and it is an object of the present invention to provide an electric storage device which can increase a power in a configuration in which the undercoat layer is arranged on the positive electrode.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In order to achieve the above-mentioned object, an electric storage device according to an aspect of the present invention is an electric storage device having a positive electrode, a negative electrode, a separator located between the positive electrode and the negative electrode, and a nonaqueous electrolyte. The positive electrode has a positive substrate layer, a positive composite layer containing a positive active material, and an undercoat layer located between the positive substrate layer and the positive composite layer. A density of the positive composite layer is 2.1 g/cm$^3$ or more and 2.7 g/cm$^3$ or less. The positive electrode has the rate of increase in sheet resistance after a solvent immersion test of 30% or less. The undercoat layer includes a binder selected from the group consisting of chitosan derivatives, cellulose derivatives and acrylic acid derivatives.

BRIEF DESCRIPTION OF THE DRAWINGS

The foregoing and other features of the present invention will become apparent from the following description and drawings of an illustrative embodiment of the invention in which.

The foregoing and other features of the present invention will become apparent from the following description and drawings of an illustrative embodiment of the invention in which.

DESCRIPTION OF EMBODIMENT

Figure 1:
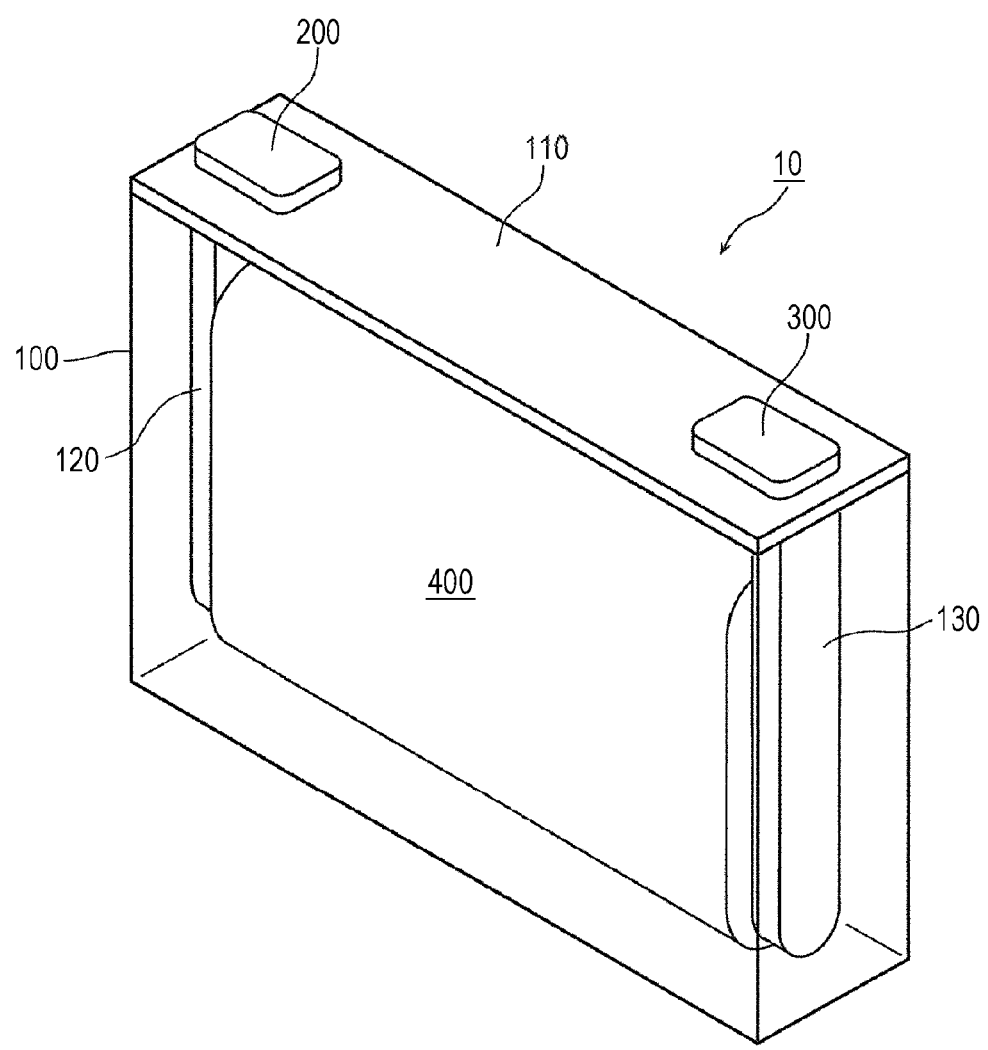
FIG. 1 is a perspective view of an appearance of an electric storage device of an embodiment of the present invention.

An electric storage device according to an aspect of the present invention is an electric storage device having a positive electrode, a negative electrode, a separator located between the positive electrode and the negative electrode, and a nonaqueous electrolyte. The positive electrode has a positive substrate layer, a positive composite layer containing a positive active material, and an undercoat layer located between the positive substrate layer and the positive composite layer. A density of the positive composite layer is 2.1 g/cm$^3$ or more and 2.7 g/cm$^3$ or less. The positive electrode has the rate of increase in sheet resistance after a solvent immersion test of 30% or less. The undercoat layer includes a binder selected from the group consisting of chitosan derivatives, cellulose derivatives and acrylic acid derivatives.

In accordance with this electric storage device, in the electric storage device in which the undercoat layer is arranged on the positive electrode, the density of the positive composite layer is 2.1 g/cm$^3$ or more and 2.7 g/cm$^3$ or less, the positive electrode has the rate of increase in sheet resistance after a solvent immersion test of 30% or less, and the undercoat layer includes a binder selected from the group consisting of chitosan derivatives, cellulose derivatives and acrylic acid derivatives. Herein, the present inventors found as the results of earnest investigations and experiments that in the case of arranging the undercoat layer in the positive electrode, a reduction of a power retention can be suppressed or a power retention can be improved when the density of the positive composite layer and the rate of increase in sheet resistance after a solvent immersion test of the positive electrode are within the above-mentioned ranges and the undercoat layer includes a binder selected from the group consisting of chitosan derivatives, cellulose derivatives and acrylic acid derivatives. That is, even when the density of the positive composite layer is increased by pressing in order to improve current collecting durability between the positive composite layer and the positive substrate layer, if the binder at the interface between the positive composite layer and the positive substrate layer swells due to an electrolyte solution and thereby, resistance of the interface increases, the power retention is reduced. Therefore, the present inventors found that when the rate of increase in sheet resistance after a solvent immersion test of the positive electrode is 30% or less the undercoat layer includes a binder selected from the group consisting of chitosan derivatives, cellulose derivatives and acrylic acid derivatives, an increase of resistance of the interface can be suppressed and in this case, an appropriate range of a density of the positive composite layer is 2.1 g/cm$^3$ or more and 2.7 g/cm$^3$ or less. Thereby, in the electric storage device in which the undercoat layer is arranged on the positive electrode, by setting the density of the positive composite layer and the rate of increase in sheet resistance after a solvent immersion test of the positive electrode within the ranges described above and by using a binder selected from the group consisting of chitosan derivatives, cellulose derivatives and acrylic acid derivatives in the undercoat layer, the power can be increased through suppression of a reduction of power retention or an improvement of power retention.

Further, a density of the positive composite layer may be 2.2 g/cm$^3$ or more and 2.6 g/cm$^3$ or less.

Herein, the present inventors found as the results of earnest investigations and experiments that a reduction of a power retention can be further suppressed or a power retention can be further improved when the density of the positive composite layer is 2.2 g/cm$^3$ or more and 2.6 g/cm$^3$ or less. Therefore, in the electric storage device in which the undercoat layer is arranged on the positive electrode, the power can be further increased by setting the density of the positive composite layer to 2.2 g/cm$^3$ or more and 2.6 g/cm$^3$ or less.

Further, the positive electrode may have the rate of increase in sheet resistance after a solvent immersion test of −50% or more.

Herein, the present inventors found as the results of earnest investigations and experiments that a reduction of a power retention can be suppressed or a power retention can be improved when the rate of increase in sheet resistance after a solvent immersion test of the positive electrode is −50% or more. Therefore, in the electric storage device in which the undercoat layer is arranged on the positive electrode, the power can be increased by setting the rate of increase in sheet resistance after a solvent immersion test of the positive electrode to −50% or more.

Further, the undercoat layer may have a thickness of 0.1 μm or more and 3.0 μm or less.

Herein, the present inventors found as the results of earnest investigations and experiments that a reduction of a power retention can be suppressed or a power retention can be improved when the thickness of the undercoat layer is 0.1 μm or more and 3.0 μm or less. Therefore, in the electric storage device in which the undercoat layer is arranged on the positive electrode, the power can be increased by setting the thickness of the undercoat layer to 0.1 μm or more and 3.0 μm or less.

Further, the undercoat layer may have a thickness of 0.2 μm or more and 2.0 μm or less.

Herein, the present inventors found as the results of earnest investigations and experiments that a reduction of a power retention can be further suppressed or a power retention can be further improved when the thickness of the undercoat layer is 0.2 μm or more and 2.0 μm or less. Therefore, in the electric storage device in which the undercoat layer is arranged on the positive electrode, the power can be further increased by setting the thickness of the undercoat layer to 0.2 μm or more and 2.0 μm or less.

Further, in the undercoat layer, a mass of the binder may be two or more times and three or less times larger than a mass of the conductive agent.

Herein, the present inventors found as the results of earnest investigations and experiments that a reduction of a power retention can be suppressed or a power retention can be improved when in the undercoat layer, a mass of the binder is two or more times and three or less times larger than a mass of the conductive agent. Therefore, in the electric storage device in which the undercoat layer is arranged on the positive electrode, the power can be increased by adjusting the mass of the binder of the undercoat layer to two times or more and three times or less larger than the mass of the conductive agent.

Further, the positive active material may have a compound represented by $Li_aNi_bM1_cM2_dW_xNb_yZr_zO_2$ (in the formula, a, b, c, d, x, y, and z satisfy the relationship of $0 \le a \le 1.2$, $0 \le b \le 1$, $0 \le c \le 0.5$, $0 \le d \le 0.5$, $0 \le x \le 0.1$, $0 \le y \le 0.1$, $0 \le z \le 0.1$, $b+c+d=1$, and M1 and M2 are respectively at least one element selected from the group consisting of Mn, Ti, Cr, Fe, Co, Cu, Zn, Al, Ge, Sn and Mg).

Herein, the present inventors found as the results of earnest investigations and experiments that a reduction of a power retention can be suppressed or a power retention can be improved in an electric storage device having a positive active material containing the above-mentioned lithium transition metal oxide. Therefore, the power can be increased in the electric storage device having a positive active material containing the lithium transition metal oxide.

The negative electrode may contain hardly-graphitizable carbon as a negative active material.

Herein, the present inventors found as the results of earnest investigations and experiments that a reduction of a power retention can be suppressed or a power retention can be improved in an electric storage device containing hardly-graphitizable carbon as the negative active material. Therefore, the power can be increased in the electric storage device containing hardly-graphitizable carbon as the negative active material.

Hereinafter, an electric storage device of an embodiment of the present invention will be described with reference to drawings. Incidentally, all of embodiments described below show a preferable specific example of the present invention. Numerical values, shapes, materials, constituent components, arrangement positions of the constituents and connecting form shown in the following embodiments are just examples and are not gist to limit the present invention. Further, of the constituents in the following embodiments, the constituent, not according to independent claim representing the most generic concept of the present invention, will be described as optional constituents constituting more preferable aspect.

First, the constitution of an electric storage device 10 will be described.

Figure 2:
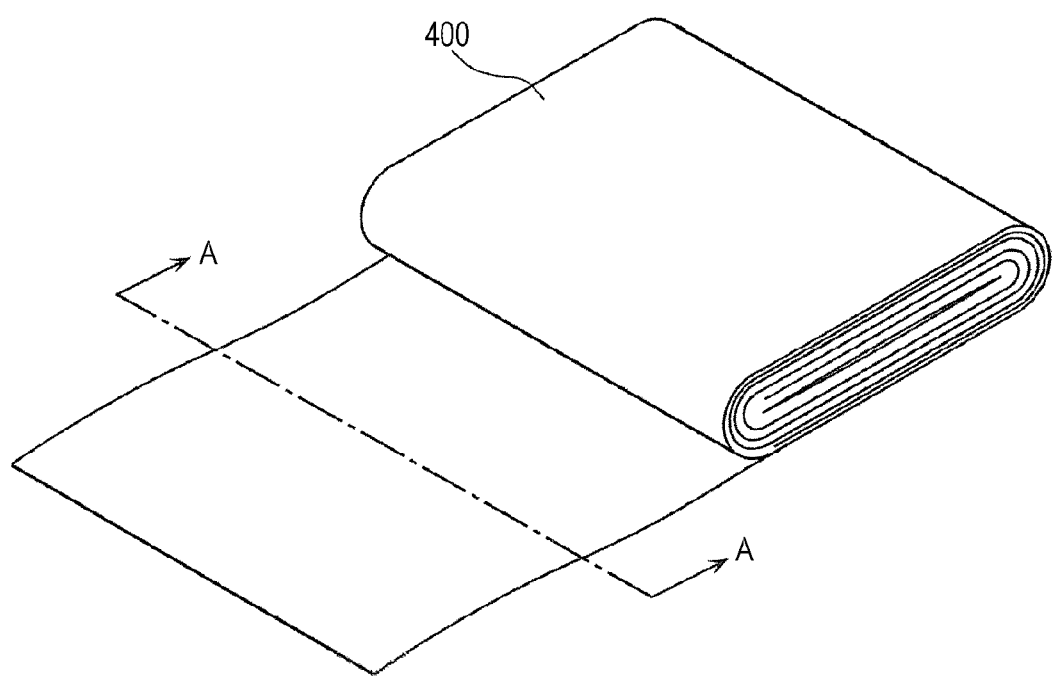
FIG. 2 is a perspective view showing a constitution of an electrode assembly of the embodiment of the present invention.
Figure 2:
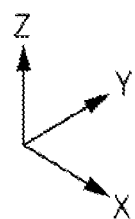

FIG. 1 is a perspective view of an appearance of the electric storage device 10 of the embodiment of the present invention. Incidentally, this drawing is a perspective view of an inside of a container. FIG. 2 is a perspective view showing a constitution of an electrode assembly 400 of the embodiment of the present invention. Incidentally, this drawing is a view of partially developing the electrode assembly 400 in a wound state shown in FIG. 1.

The electric storage device 10 is a secondary battery capable of charging and discharging the electricity, and more specifically a nonaqueous electrolyte secondary battery such as a lithium ion secondary battery. For example, the electric storage device 10 is a secondary battery which is used for hybrid electric vehicles (HEV), plug-in hybrid electric vehicles (PHEV), and electric vehicles (EV). Incidentally, the electric storage device 10 is not limited to the nonaqueous electrolyte secondary battery, and may be a secondary battery other than the nonaqueous electrolyte secondary battery, or may be a capacitor.

As shown in these drawings, the electric storage device 10 includes a container 100, a positive terminal 200 and a negative terminal 300, and the container 100 includes a lid plate 110 being an top wall. Within the container 100, an electrode assembly 400, a positive current collector 120 and a negative current collector 130 are arranged. A liquid such as an electrolyte solution (nonaqueous electrolyte) is introduced in the container 100 of the electric storage device 10; however the liquid is not shown in a drawing.

The container 100 is constituted by a housing body which is rectangular tube-shaped, has a bottom, and is made of metal, and a metallic lid plate 110 closing an opening of the housing body. Further, the container 100 is adapted to be able to hermetically seal the inside by, for example, welding the lid plate 110 to the housing body after the electrode assembly 400 and the like are housed in the container 100.

The electrode assembly 400 includes a positive electrode, a negative electrode and a separator, and is a member which can store electricity. Specifically, as shown in FIG. 2, the electrode assembly 400 is formed by winding a whole layers in which a separator is sandwiched between a negative electrode and a positive electrode, are arranged so as to have an oblong shape. Incidentally, in this figure, the electrode assembly 400 having the oblong shape is shown, but the electrode assembly 400 may have a circular shape or an elliptical shape. Further, the form of the electrode assembly 400 is not limited to a wound type, and it may be the form of stacking flat plate-shaped electrode plates (stack type). Detailed constitution of the electrode assembly 400 will be described later.

The positive terminal 200 is an electrode terminal electrically connected to the positive electrode of the electrode assembly 400, and the negative terminal 300 is an electrode terminal electrically connected to the negative electrode of the electrode assembly 400. That is, the positive terminal 200 and the negative terminal 300 are metallic electrode terminals for leading the electricity stored in the electrode assembly 400 to the external space of the electric storage device 10, and for introducing electricity in the internal space of the electric storage device 10 in order to store the electricity in the electrode assembly 400.

The positive current collector 120 is arranged between the positive electrode of the electrode assembly 400 and a side wall of the container 100, and is a member having conductivity and rigidity, electrically connected between the positive terminal 200 and the positive electrode of the electrode assembly 400. Incidentally, the positive current collector 120 is formed of aluminum or an aluminum alloy as with a positive substrate layer of the electrode assembly 400 described later.

Further, the negative current collector 130 is arranged between the negative electrode of the electrode assembly 400 and a side wall of the container 100, and is a member having conductivity and rigidity, electrically connected between the negative terminal 300 and the negative electrode of the electrode assembly 400. Incidentally, the negative current collector 130 is formed of copper or a copper alloy as with a negative substrate layer of the electrode assembly 400 described later.

Further, various compounds can be selected for the nonaqueous electrolyte (electrolyte solution) introduced in the container 100. In the electric storage device 10, a combination of the following organic solvent and an electrolyte salt is used as the nonaqueous electrolyte.

Examples of the organic solvent of the nonaqueous electrolyte include, but are not limited to, one compound or a mixture of two or more of compounds of cyclic carbonic esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethylmethyl carbonates; chain esters such as methyl formate, methyl acetate, and methyl butyrate tetrahydrofuran and derivatives thereof, ethers such as 1,3-dioxane, 1,4-dioxane, 1,2-dimethoxyethane, 1,4-dibutoxyethane, and methyl diglyme; nitriles such as acetonitrile and benzonitrile; dioxolan and derivatives thereof, and ethylene sulfide, sulfolane, sultone and derivatives thereof. Incidentally, a publicly known additive may be added to the nonaqueous electrolyte.

Further, examples of electrolyte salts contained in the nonaqueous electrolyte include inorganic ionic salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_3)_4NClO_4$, $(n-C_4H_3)_4NI$, $(C_2H_3)_4N$-maleate, $(C_2H_5)_4N$-benzoate, $(C_2H_5)_4N$-phthalate, lithium stearylsulfonate, lithium octylsulfonate, and lithium dodecylbenzenesulfonate. These ionic compounds may be used alone or in combination of two or more of them.

Next, a detailed constitution of the electrode assembly 400 will be described.

Figure 3:
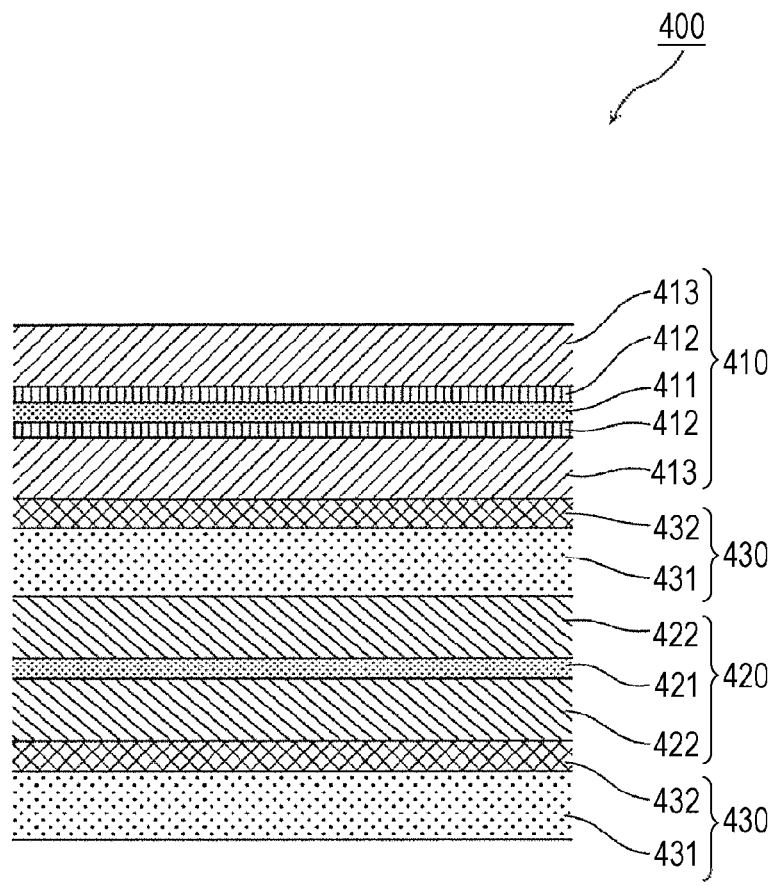
FIG. 3 is a sectional view showing a constitution of the electrode assembly of the embodiment of the present invention.
Figure 3:
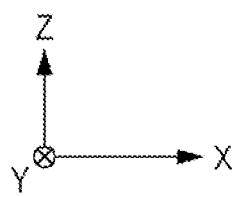

FIG. 3 is a sectional view showing a constitution of the electrode assembly 400 of the embodiment of the present invention. Specifically FIG. 3 is a view showing a cross section of a developed portion of the electrode assembly 400 in a wound state shown in FIG. 2, taken along line A-A.

As shown in FIG. 3, the electrode assembly 400 is formed by laminating a positive electrode 410, a negative electrode 420, and two separators 430. Specifically, the positive electrode 410 and the negative electrode 420 are laminated with the separator 430 located therebetween.

First, the positive electrode 410 will be described. The positive electrode 410 has a positive substrate layer 411, an undercoat layer 412 and a positive composite layer 413.

The positive substrate layer 411 is a long belt-like conductive current collecting foil made of aluminum or aluminum alloy. Incidentally, as the current collecting foil, a publicly known material, such as nickel, iron, stainless steel, titanium, baked carbon, conductive polymer, conductive glass, Al—Cd alloy and the like, can also be appropriately used.

The undercoat layer 412 is a thermosetting undercoat layer which is formed on the surface (in FIG. 3, both surfaces in a plus direction and in a minus direction of a Z-axis) of the positive substrate layer 411 and is different in a resin type or a composite ratio from the positive composite layer 413. Therefore, the undercoat layer 412 is located between the positive substrate layer 411 and the positive composite layer 413. Further, the undercoat layer 412 contains a binder (organic binder) and a conductive agent.

Herein, examples a resin of a material of the organic binder used in the undercoat layer 412 include at least one selected from the group consisting of chitosan derivatives, cellulose derivatives, and acrylic acid derivatives. The chitosan derivatives contain chitin derivatives. That is, the under coat layer 412 includes a binder selected from the group consisting of chitosan derivatives, cellulose derivatives, and acrylic acid derivatives.

Specific examples of the chitin-chitosan derivatives include hydroxyethyl chitosan, hydroxypropyl chitosan, hydroxybutyl chitosan, and at least one hydroxyalkyl chitosan selected from the group consisting of alkylated chitosans and the like. Incidentally, it is preferred from the viewpoint of binder durability that the chitin-chitosan derivatives are mixed with organic acid such as salicylic acid, pyromellitic acid, citric acid, trimellitic acid and the like, and heated to have a cross-linked structure.

One example of the cellulose derivatives includes CMC (carboxymethylcellulose) and a salt thereof. Specific examples of the CMC include H-CMC, Na-CMC, $NH_4$-CMC and the like. The specific example of the CMC is preferably $NH_4$-CMC (DN series) manufactured by Daicel FineChem Ltd. The specific examples of acrylic acid derivatives include Polysol manufactured by Showa Denko Kabushiki Kaisha and NIPOL manufactured by Zeon Corporation.

An additive amount of the organic binder is preferably 20 to 80% by mass, and more preferably 50 to 75% with respect to the whole raw material of the undercoat layer 412. This amount of the organic binder is added to the undercoat layer 412, adhesion strength of the undercoat layer is enhanced, adhesion of an interface between the positive substrate layer 411 and the positive composite layer 413 is secured, and electric conductivity can be maintained.

Further, as the conductive agent to be used for the undercoat layer 412, particles having a high electric conducting property are used. Examples of the conductive agent include at least one selected from the group consisting of carbon-based materials of carbon black, acetylene black, Ketjen Black and the like and metal fine particles of iron, nickel, copper, aluminum and the like.

Incidentally, an additive amount of the conductive agent is preferably 5 to 50% by mass, and more preferably 10 to 30% by mass with respect to the whole raw material of the undercoat layer 412. This amount of the conductive agent is added to the undercoat layer 412, thereby an appropriate electric conducting property can be maintained.

In the undercoat layer 412, the mass of the binder is preferably two or more times and three or less times larger than the mass of the conductive agent. Further, the thickness of the undercoat layer 412 is preferably 0.1 µm or more and 3.0 µm or less, and more preferably 0.2 µm or more and 2.0 µm or less. Thereby, in the electric storage device 10, a reduction of the power retention can be suppressed or the power retention can be improved, and the power can be increased.

The positive composite layer 413 is an active material layer formed on the surface of the undercoat layer 412. That is, the positive composite layer 413 is formed on each of surfaces of two undercoat layers 412 arranged on both surfaces in a plus direction and in a minus direction of a Z-axis of the positive substrate layer 411. The positive composite layer 413 includes a positive active material, a conductive agent and a binder.

As the positive active material used in the positive composite layer 413, a publicly known material can be appropriately used as long as it is a positive active material capable of absorbing/releasing lithium ions. For example, as the positive active material, it is preferred to use, a compound represented by $Li_aNi_bM1_cM2_dW_xNb_yZr_zO_2$ (in the formula, a, b, c, d, x, y, and z satisfy the relationship of $0 \le a \le 1.2$, $0 \le b \le 1$, $0 \le c \le 0.5$, $0 \le d \le 0.5$, $0 \le x \le 0.1$, $0 \le y \le 0.1$, $0 \le z \le 0.1$, $b+c+d=1$, and M1 and M2 are respectively at least one element selected from the group consisting of Mn, Ti, Cr, Fe, Co, Cu, Zn, Al, Ge, Sn and Mg). Incidentally, a D50 particle size of the positive active material is preferably 2 µm to 8 µm. Herein, the D50 particle size refers to a particle size at which a cumulative amount of particles which is equal to or less than a specific particle size, reaches 50% of a volume (cumulative distribution) in measuring a volumetric distribution of particles using a laser diffraction and scattering method.

Herein, the density of the positive composite layer 413 is 2.1 $g/cm^3$ or more and 2.7 $g/cm^3$ or less, preferably 2.2 $g/cm^3$ or more and 2.6 $g/cm^3$ or less, and more preferably 2.3 $g/cm^3$ or more and 2.5 $g/cm^3$ or less. Thereby, in the electric storage device 10, a reduction of the power retention can be suppressed or the power retention can be improved, and the power can be increased.

The type of the conductive agent to be used for the positive composite layer 413 is not particularly limited, and it may be metal or may be non-metal. As a metal conductive agent, a material formed of a metal element such as copper or nickel may be used. As the nonmetallic conductive agent, carbon materials such as graphite, carbon black, acetylene black and Ketjen Black can be used.

A type of a binder used for the positive composite layer 413 is not particularly limited as long as it is stable to a solvent and an electrolyte solution used in manufacturing an electrode and stable to an oxidation-reduction reaction during charging/discharging. As the binder, for example, thermoplastic resins such as polytetrafluoroethylene (PTFE), polyvinylidene fluoride (PVDF), polyethylene and polypropylene; and polymers having rubber elasticity such as ethylene-propylene-diene terpolymer (EPDM), sulfonated EPDM, styrene-butadiene rubber (SBR) and fluorine-contained rubber can be used singly or in combination of two or more of them.

Herein, the rate of increase in sheet resistance after a solvent immersion test of the positive electrode 410 is 30% or less, and preferably −50% or more. Thereby, in the electric storage device 10, a reduction of the power retention can be suppressed or the power retention can be improved, and the power can be increased. Incidentally, the rate of increase in sheet resistance after a solvent immersion test of the positive electrode 410 will be described in detail later.

Next, the negative electrode 420 will be described. The negative electrode 420 has a negative substrate layer 421 and a negative composite layer 422.

The negative substrate layer 421 is a long belt-like conductive current collecting foil made of copper or copper alloy. Incidentally, as the current collecting foil, a publicly known material, such as nickel, iron, stainless steel, titanium, baked carbon, conductive polymer, conductive glass, Al—Cd alloy and the like, can also be appropriately used.

The negative composite layer 422 is an active material layer formed on the surface (in FIG. 3, both surfaces in a plus direction and in a minus direction of a Z-axis) of the negative substrate layer 421. The negative composite layer 422 includes a negative active material, a conductive agent and a binder.

Examples of the negative active material used in the negative composite layer 422 include carbon materials, elements which can be alloyed with lithium, alloys, metal oxides, metal sulfides and metal nitrides. Examples of the carbon materials include hard carbon, soft carbon, graphite and the like. Examples of the elements which can be alloyed with lithium include Al, Si, Zn, Ge, Cd, Sn and Pb, and the like. These elements may be contained singly or may be contained in combination of two or more thereof. Examples of the alloys include alloys containing a transition metal element such as a Ni—Si alloy and a Ti—Si alloy. Examples of the metal oxides include amorphous tin oxides such as $SnB_{0.4}P_{0.6}O_{3.1}$ and the like, tin-silicon oxides such as $SnSiO_3$, silicon oxides such as SiO, and lithium titanate having a spinel structure such as $Li_{4+x}Ti_5O_{12}$ and the like. Examples of the metal sulfides include lithium sulfide such as $LiS_2$, molybdenum sulfide such as $MoS_2$, and iron sulfides such as FeS, $FeS_2$, $Li_xFeS_2$ and the like. Among these compounds, hard carbon (hardly-graphitizable carbon) is particularly preferred, and above all hard carbon having a small particle diameter D50 smaller than 8 μm is preferred.

Since the conductive agent used in the negative composite layer 422 is similar to the conductive agent used in the positive composite layer 413, a detailed explanation thereof will be omitted.

A type of a binder used for the negative composite layer 422 is not limited as long as it is stable to a solvent or an electrolyte solution used in manufacturing an electrode and stable to an oxidation-reduction reaction during charging/discharging. For example, thermoplastic resins such as polytetrafluoroethylene (PTFE), polyvinylidene fluoride (PVDF), polyethylene and polypropylene; and polymers having rubber elasticity such as ethylene-propylene-diene terpolymer (EPDM), sulfonated EPDM, styrene-butadiene rubber (SBR) and fluorine-contained rubber can be used singly or in combination of two or more of them.

Next, the separator 430 will be described. The separator 430 is a long belt-like separator located between the positive electrode 410 and the negative electrode 420, and is wound in a longitudinal direction (Y-axis direction) together with the positive electrode 410 and the negative electrode 420 and a plurality of this wound layers are superimposed to form an electrode assembly 400. The separator 430 has a separator substrate layer 431 and an inorganic filler layer 432.

The separator substrate layer 431 is a main body of the separator 430 and resin porous membranes in general can be used. As the separator substrate layer 431, for example, a resin porous membrane made of a cloth or non-woven fibers of polymer, natural fibers, hydrocarbon fibers, glass fibers or ceramic fibers is used. The resin porous membrane preferably has a cloth or non-woven polymer fibers. Particularly, it is preferred that the resin porous membrane has a polymer cloth or fleece, or is such a cloth or a fleece. The resin porous membrane preferably has, as the polymer fibers, non-conductive fibers of a polymer selected from polyacrylonitrile (PAN), polyamide (PA), polyester, for example, polyethylene terephthalate (PET) and/or polyolefin (PO), for example, polypropylene (PP) or polyethylene (PE) or a mixture or a composite membrane of such polyolefins. Further, the resin porous membrane may be a polyolefin microporous membrane, nonwoven fabric, paper or the like, and preferably a polyolefin microporous membrane. Incidentally, in consideration of the effect on battery characteristics, a thickness of the separator substrate layer 431 is preferably about 5 to 30 μm.

The inorganic filler layer 432 is a layer which is provided for at least one surface of the separator substrate layer 431 and disposed on the separator substrate layer 431. Incidentally, the inorganic filler layer 432 is coated on the upper surface of the separator substrate layer 431 in FIG. 3; however, the inorganic filler layer 432 may be coated on the lower surface of separator substrate layer 431 or may be coated on both surfaces. Further, the inorganic filler layer 432 does not have to be arranged on the separator substrate layer 431 as long as it is arranged between the positive electrode 410 and the negative electrode 420; however, the inorganic filler layer 432 is preferably arranged on the separator substrate layer 431 as shown in FIG. 3.

Specifically, the inorganic filler layer 432 is a heat-resistant coated layer containing heat-resistant inorganic particles as heat-resistant particles. As the inorganic particles, both synthetic particles and natural particles can be employed without limitation. For example, the inorganic particles comprise one material, a mixture or a composite compound of one or more inorganic materials of the following inorganic materials. That is, examples of the inorganic particles include oxides such as $SiO_2$, $Al_2O_3$, $TiO_2$, $BaTiO_2$, ZrO and alumina-silica composite oxides; nitride fine particles such as aluminum nitride and silicon nitride; slightly soluble ionic crystal fine particles such as calcium fluoride, barium fluoride, and barium sulfate; covalent crystal fine particles such as silicon and diamond; clay fine particle such as talc and montmorillonite; and materials derived from mineral source such as boehmite, zeolite, apatite, kaolin, mullite, spinel, olivine, sericite, bentonite and mica, or manmade substance thereof, and the like. Further, the inorganic particles may be fine particles which are provided with electrical insulating properties by surface treating the surfaces of the conductive fine particles such as oxide fine particles, for example, $SnO_2$, indium-tin oxide (ITO); and carbonaceous fine particles such as carbon black and graphite with a material having electrical insulating properties (e.g., the material constituting the above-mentioned electric insulating inorganic particles). As a material of the inorganic particles, $SiO_2$, $Al_2O_3$, and alumina-silica composite oxide are preferred.

Further, the inorganic filler layer 432 is preferably formed by applying a solution obtained by dissolving inorganic particles and a binder in a solvent onto the separator substrate layer 431. Examples of the binder include polyacrylonitrile, polyvinylidene fluoride, a copolymer of polyvinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Particularly, from the viewpoint of electrochemical stability, polyacrylonitrile, polyvinylidene fluoride, polyhexafluoropropylene and polyethylene oxide are preferred. Further, the binder to be used in the present embodiment is particularly preferably polyvinylidene fluoride (PVDF), polyacrylic acid, polymethacrylic acid or styrene-butadiene rubber (SBR).

Incidentally, in the present embodiment, the separator 430 preferably has air permeability of 30 to 150 seconds/100 cc. The separator 430 preferably includes the inorganic filler layer 432; however it may have a constitution not including the inorganic filler layer 432.

Next, the reason why the electric storage device 10 having the above-mentioned constitution can increase a power will be described in detail.

EXAMPLES

First, a method of manufacturing the electric storage device 10 will be described. Specifically, batteries as the electric storage devices in Examples 1 to 33 and Comparative Examples 1 to 37 described later were prepared in the following manner. Incidentally, all of Examples 1 to 33 relates to the electric storage device 10 according to the embodiment described above.

(1-1) Preparation of Positive Electrode $LiNi_xMn_yCo_2O_2$ was used for the positive active material. Further, acetylene black was used for the conductive agent, PVDF was used for the binder, and these were mixed so that the positive active material, the conductive agent and the binder were 90% by mass, 5% by mass, and 5% by mass, respectively. An aluminum foil having a thickness of 20 μm was used for a positive substrate layer and an undercoat layer was formed on the aluminum foil. Then a coating material composed of a positive active material, a conductive agent and a binder was applied in the form of foil onto the positive substrate layer provided with the undercoat layer, dried and pressed so that a density of the positive composite layer becomes the density described in Tables 1 to 4 below. Incidentally, in Comparative Examples 5, 27 to 37, positive electrodes were prepared without forming the undercoat layers on the positive substrate layers.

Here, a mixed solution for an undercoat layer was prepared in the following manner, and an undercoat layer was formed. That is, chitosan (hydroxyethyl chitosan) as an organic binder and acetylene black (agglomerated particle size less than 500 nm) as a conductive agent were mixed in a dispersion solvent (N-methyl-2-pyrrolidone) to obtain a mixed solution. Incidentally, pyromellitic acid was added in the proportions of 1 part pyromellitic acid to 1 part chitosan as a crosslinking agent. A mixing ratio between the conductive agent and the organic binder was as a mass ratio described in Tables 1 to 3 described later. Further, in Examples 25 to 33 and Comparative Examples 17 to 26, mixed solutions were prepared by using organic binders described in Table 3 in place of chitosan.

Then, the mixed solution was applied onto an aluminum foil having a thickness of 20 μm and dried at 150° C. (temperatures described in Table 3 were used in Examples 21 to 33 and Comparative Examples 14 to 26) to form undercoat layers having thicknesses described in Tables 1 to 3.

Incidentally, in Examples 25 to 32 and Comparative Example 17, carboxymethylcellulose ammonium salt was dissolved in an ion-exchange water and the viscosity thereof was adjusted. Then, the conductive agent was added and the mixture was applied onto an aluminum foil and dried at the predetermined temperature (temperatures described in Table 3) to form undercoat layers.

Further, in Example 33 and Comparative Examples 18 and 19, acrylic acid ester latex and, as a dispersant, carboxymethylcellulose ammonium salt were dissolved in an ion-exchange water similarly. The conductive agent was added to the mixture and the resultant was applied onto an aluminum foil and dried at the predetermined temperature (temperatures described in Table 3) to form undercoat layers.

(1-2) Preparation of Negative Electrode

Hard carbon (hardly-graphitizable carbon) was used as the negative active material. Further, PVDF was used for the binder, and these were mixed so that the negative active material and the binder were 95% by mass and 5% by mass, respectively.

Further, a copper foil having a thickness of 10 μm was used for a negative substrate layer, and a mixture formed by adding N-methyl-2-pyrrolidone (NMP) to a negative active material, a conductive agent and a binder was kneaded, applied onto the negative substrate layer, and dried, and then pressed.

(1-3) Preparation of Separator

A microporous membrane made of polyolefin having air permeability of 120 seconds/100 cc was used as a separator substrate layer. Inorganic particles (alumina particles), a binder (acrylic acid) and the like were mixed to prepare a coating material. Then, the coating material was applied onto the separator substrate layer by a gravure printing method and dried at 80° C. to prepare an inorganic layer-containing separator provided with an inorganic filler layer.

(1-4) Production of Nonaqueous Electrolyte

A nonaqueous electrolyte was prepared by dissolving $LiPF_6$ as an electrolyte salt so as to have a concentration of 1 mol/L in a mixed solvent in which a volume ratio of propylene carbonate (PC), dimethyl carbonate (DMC) and ethylmethyl carbonate (EMC) is 3:2:5. Incidentally, to this, a publicly known additive may be added as an additive.

(1-5) Preparation of Battery

A positive electrode, a negative electrode and a separator were superimposed in such a way that an inorganic filler layer is opposed to the positive electrode, and the resultant was wound and inserted into a container, a nonaqueous electrolyte was injected, and the container was sealed.

Herein, evaluation tests of numerical values of the positive electrode were carried out in the following manner. An average value of 10 samples was employed in all of these tests.

(2-1) Taking Positive Electrode from Battery

The battery was disassembled in a discharged state (2V), and the positive electrode was taken out, adequately washed with DMC, and vacuum-dried at 25° C. In all of the following tests, samples after washing and drying were used.

(2-2) Thickness of Positive Composite Layer Per One Surface

A thickness L of a portion onto which the positive composite was applied was measured with a micrometer. Thereafter, the composite was peeled by using acetone or NMP, and a thickness Lb of the foil after peeling the composite was measured. An application thickness of the positive composite layer per one surface was determined from an equation $(L-Lb)/2$. Incidentally, a solvent to be used in order to peel the composite is not particularly limited as long as it does not erode the positive substrate layer (foil). Further, measurement was carried out 5 times per sample, and an average value thereof was taken as a thickness of a positive composite layer per one surface of one sample. Thicknesses of a positive composite layer per one surface of ten samples were averaged to obtain a thickness of a positive composite layer per one surface.

(2-3) Positive Electrode Sheet Resistance

Each positive electrode was cut out into a sample with a size of 2 cm×2 cm, and sheet resistance was measured with a two probe resistivity meter Mitsubishi Chemical Analytech Co., Ltd., Loresta EP, 2-pin probe MCP-TRAP was used as a probe) in an environment where a temperature was 25±10° C. and a dew point was 0° C. or less. Measurement was carried out 5 times per one surface of one sample, and an average value of a total of 10 measurements was taken as sheet resistance of one sample. Incidentally, when the positive composite layer is formed on only one surface, an average value of 5 measurements of a surface coated with the composite was taken as sheet resistance of one sample. Sheet resistance of ten samples was measured, and an average thereof was taken as positive electrode sheet resistance.

(2-4) Solvent Immersion Test of Positive Electrode (Swelling Test of Positive Electrode)

Each positive electrode was cut out into a sample with a size of 2 cm×2 cm, and the sample was immersed in a mixed solvent which was prepared by mixing propylene carbonate, dimethyl carbonate and ethylmethyl carbonate in proportions of 6:7:7, stored for 2 days with a container sealed with a laminate in a constant-temperature oven at 65° C. After storage, the sample was taken out from the container, adequately washed with DMC, and vacuum-dried at 25° C. Then, sheet resistance of the positive electrode after the solvent immersion test of the positive electrode (swelling test of the positive electrode) was measured, and rate of increase in sheet resistance in Tables 1 to 4 below was calculated from the formula, Rate of increase in sheet resistance=(sheet resistance of positive electrode after solvent immersion test)/(sheet resistance of positive electrode before solvent immersion test)×100−100.

(2-5) Weight of Positive Composite Layer Per One Surface

Each positive electrode was cut out into a sample with a size of 2 cm×2 cm, and weight Ma was measured. Thereafter, the composite was peeled by using acetone or NMP, and a foil weight Mb after peeling the composite was measured. An application weight per one surface of the positive composite layer per unit area was determined from an equation (Ma−Mb)/8. Incidentally, a solvent to be used in order to peel the composite is not particularly limited as long as it does not erode the positive substrate layer (foil). Further, measurement was carried out 5 times per sample. An average value thereof was taken as a weight per one surface of a positive composite layer of one sample, and weight per one surface of a positive composite layer of ten samples were averaged to obtain a weight of a positive composite layer per one surface.

(2-6) Positive Composite Density

The positive composite density in Tables 1 to 4 below was calculated from an equation, Positive composite density per unit area=(weight of positive composite layer per one surface)/(thickness of positive composite layer per one surface).

(2-7) Thickness of Undercoat Layer

The positive electrode was subjected to cross section polisher (CP) processing to expose a cross section, and the cross section was observed with a scanning electron microscope (SEM) to determine a thickness of the undercoat layer, and each thickness is shown in Tables 1 to 3.

Next, the following numerical values were determined to perform a battery evaluation test. An average value of 3 samples was employed in all of these tests.

(3-1) Capacity Verification Test

The following tests were performed in a constant-temperature oven maintained at 25° C. First, (3-1a) the constant current discharge test was carried out at a discharge current of 4 A to 2.4 V of a lower limit voltage, and then (3-1b) the constant current constant voltage charge of a charge current of 4 A was carried out at an upper limit voltage of 4.1 V for 3 hours, and then the constant current discharge test was carried out at a discharge current of 4 A to 2.4 V of a lower limit voltage. A capacity at the time of discharge of (3-1b) was taken as a battery capacity.

(3-2) Power Output Test at 25° C.

1 C (A) was determined from the last capacity verification test, and the battery was charged at 25° C. for one hour and at 0.5 C(A) from the discharged state to adjust a SOC (state of charge) of the battery to 50%. Thereafter, the discharge was carried out at 25° C. and at a current of 40 C(A). Resistance at one second D1 was calculated from the formula, Resistance at one second D1=(Difference between voltage at one second and voltage before current-carrying)/current. The power at one second was calculated from the formula, Power at one second W1=(Voltage before current-carrying−lower limit voltage)/D1×(lower limit voltage). Also, similarly resistance at ten seconds D2 was calculated from the formula, Resistance at ten second D2=(Difference between voltage at ten seconds and voltage before current-carrying)/current, and the power at ten seconds was calculated from the formula, Power at ten seconds W2=(Voltage before current-carrying−lower limit voltage)/D2×(lower limit voltage).

(3-3) Battery Repetitive Storage Test

First, (3-3a) 1 C (A) was determined from the current capacity discharged in the last discharge test at 25° C. and at 4 A (upper limit 4.1 V, lower limit 2.4 V), and the battery was charged at 25° C. for 1.6 hours and at 0.5 C(A) from the discharged state to adjust a SOC of the battery to 80%. Then, (3-3b) the battery was stored for 30 days in a constant-temperature oven at 60° C., taken out and cooled to room temperature, and then the capacity verification test and the power output test at 25° C. were performed. The above operations from (3-3a) to (3-3b) were repeatedly performed until the number of cumulative days of storage reaches 360 days. Incidentally, the test was carried out by tightly pressing the battery with a metal plate so that a thickness is limited to an initial thickness plus 1 mm or less in order to prevent swelling of a battery. The power W1 at one second after the test is referred to as a power (at one second) after deterioration in the following Tables 1 to 4, and the power W2 at ten seconds after the test is referred to as a power (at ten seconds) after deterioration in the following Tables 1 to 4.

The positive composite density, the thickness of the undercoat layer, the rate of increase in the sheet resistance and the power (at one second and at ten seconds) after deterioration of the battery, thus obtained, are shown in the following Tables 1 to 4. That is, in the following Tables 1 to 4, comparisons of positive composite densities, thicknesses of the undercoat layer, mass ratios of the conductive agent to the binder, rate of increase in the sheet resistance, and powers (at one second and at ten seconds) after deterioration of batteries in varying a type of a binder in an undercoat layer are performed on Examples 1 to 33 and Comparative Examples 1 to 37.

First, Examples 1 to 7 and Comparative Examples 1 to 4 will be described by using Table 1 below. As shown in Table 1 below, Examples 1 to 7 and Comparative Examples 1 to 4 show the powers (at one second and at ten seconds) after deterioration of batteries in fixing the thickness of the undercoat layer, the mass ratio of the conductive agent to the binder and the type of the binder in the undercoat layer, and in varying the positive composite density and the resistance after a positive electrode test.

Incidentally, "Positive composite density" in Table 1 indicates a density of the positive composite layer, "Thickness of undercoat layer" indicates a thickness of the undercoat layer, and "Conductive agent: Binder" indicates a mass ratio of the conductive agent in the undercoat layer to the binder. "Rate of increase in sheet resistance" indicates the rate of increase in the sheet resistance after a solvent immersion test of the positive electrode at the time when taking the sheet resistance before a solvent immersion test of the positive electrode as 100. Further, "Type of binder in undercoat layer" indicates a type of the binder in the undercoat layer. Further, "Power after deterioration (at one second)" indicates a power W1 at one second after the above-mentioned repetitive storage test of a battery at the time when taking the power at one second of Example 1 as 100, and "Power after deterioration (at ten seconds)" indicates a power W2 at ten seconds after the above-mentioned repetitive storage test of a battery at the time when taking the power at ten seconds of Example 1 as 100. That is, "Power after deterioration" is an assist power after a high-temperature storage test (after being left at a high-temperature and at high SOC). Incidentally, in all of Examples and Comparative Examples, the battery capacities before the test at the time when taking that of Example 1 as 100 were 100. Further, the results in Tables 2 to 4 described later are similar to those in Table 1.

TABLE 1

|  | Positive composite density (g/cm³) | Thickness of undercoat layer (μm) | Conductive agent:Binder (mass ratio) | Rate of increase in sheet resistance | Type of binder in undercoat layer | Power after deterioration Percentage (%) with respect to Example 1 | |
|---|---|---|---|---|---|---|---|
|  |  |  |  |  |  | at one second | at 10 seconds |
| Example 1 | 2.5 | 0.5 | 1:2 | −15 | Chitosan | 100 | 100 |
| Comparative Example 1 | 1.9 | 0.5 | 1:2 | −10 | Chitosan | 88 | 95 |
| Comparative Example 2 | 2.0 | 0.5 | 1:2 | −2 | Chitosan | 91 | 96 |
| Example 2 | 2.1 | 0.5 | 1:2 | −1 | Chitosan | 97 | 100 |
| Example 3 | 2.2 | 0.5 | 1:2 | 0 | Chitosan | 98 | 101 |
| Example 4 | 2.3 | 0.5 | 1:2 | −17 | Chitosan | 100 | 101 |
| Example 5 | 2.4 | 0.5 | 1:2 | −22 | Chitosan | 101 | 100 |
| Example 6 | 2.6 | 0.5 | 1:2 | −15 | Chitosan | 100 | 97 |
| Example 7 | 2.7 | 0.5 | 1:2 | −40 | Chitosan | 100 | 94 |
| Comparative Example 3 | 2.8 | 0.5 | 1:2 | −5 | Chitosan | 100 | 85 |
| Comparative Example 4 | 2.9 | 0.5 | 1:2 | −2 | Chitosan | 101 | 75 |

Figure 4:
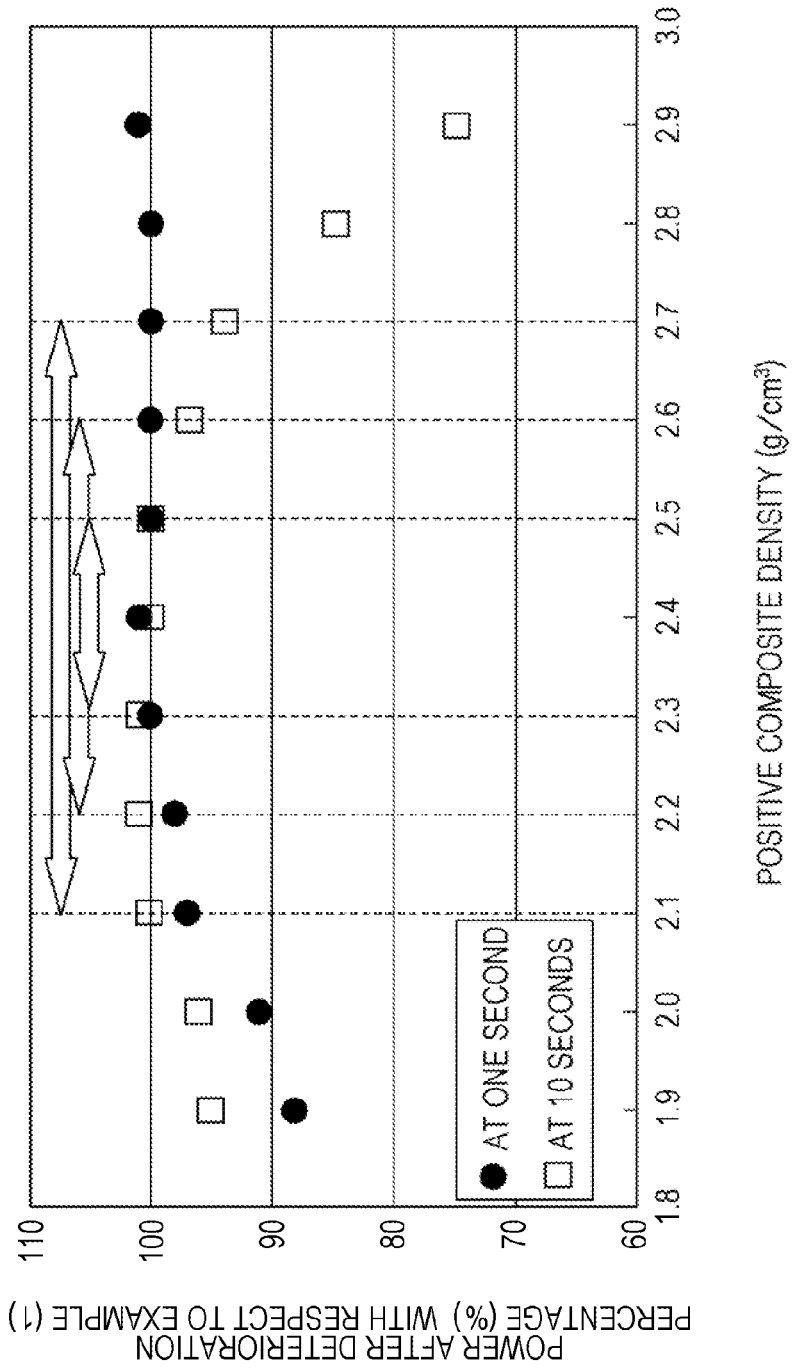
FIG. 4 is a view showing a power after deterioration in varying a positive composite density.

Further. FIG. 4 is a view showing a power (at one second and at ten seconds) after deterioration in varying the positive composite density. Specifically, FIG. 4 is a graph with "Power after deterioration (at one second)" and "Power after deterioration (at a10 seconds)" in Table 1 (both represented by a percentage (%) with respect to Example 1) on the vertical-axis and "Positive composite density" on the horizontal-axis.

As shown in Table 1 and FIG. 4 described above, when the positive composite density is 2.1 g/cm³ or more and 2.7 g/cm³ or less, a reduction of the power (at one second and at ten seconds) after deterioration can be suppressed or the power after deterioration can be improved, and therefore a reduction of a power retention can be suppressed or the power retention can be improved. Herein, the power retention is a ratio of the power after the test to the power before the test; however, since the power before the test is taken as 100, the power retention exhibits the same value as in the power after deterioration.

Further, as shown in Table 1 and FIG. 4, when the positive composite density is 2.2 g/cm³ or more and 2.6 g/cm³ or less (preferably 2.3 g/cm³ or more and 2.5 g/cm³ or less), a reduction of the power (at one second and at ten seconds) after deterioration can be further suppressed or the power after deterioration can be further improved, and therefore a reduction of a power retention can be further suppressed or the power retention can be further improved.

Therefore, in the present embodiment, the density of the positive composite layer 413 is 2.1 g/cm³ or more and 2.7 g/cm³ or less, preferably 2.2 g/cm³ or more and 2.6 g/cm³ or less, and more preferably 2.3 g/cm³ or more and 2.5 g/cm³ or less.

Next, Examples 8 to 20 and Comparative Examples 5 to 13 will be described by using Table 2 below. As shown in Table 2 below, Examples 8 to 20 and Comparative Examples 5 to 13 show the powers (at one second and at ten seconds) after deterioration of batteries in fixing the positive composite density and the type of the binder in the undercoat layer, and in varying the thickness of the undercoat layer, the mass ratio of the conductive agent to the binder and the rate of increase in the sheet resistance.

TABLE 2

|  | Positive composite density (g/cm³) | Thickness of undercoat layer (μm) | Conductive agent:Binder (mass ratio) | Rate of increase in sheet resistance | Type of binder in undercoat layer | Power after deterioration Percentage (%) with respect to Example 1 | |
|---|---|---|---|---|---|---|---|
|  |  |  |  |  |  | at one second | at 10 seconds |
| Comparative Example 5 | 2.5 | 0 | 0 | 72 | — | 78 | 90 |
| Comparative Example 6 | 2.5 | 0.05 | 1:2 | 53 | Chitosan | 85 | 94 |
| Example 8 | 2.5 | 0.1 | 1:2 | 15 | Chitosan | 95 | 99 |
| Example 9 | 2.5 | 0.1 | 1:3 | 30 | Chitosan | 94 | 99 |
| Comparative Example 7 | 2.5 | 0.1 | 1:4 | 45 | Chitosan | 90 | 97 |
| Example 10 | 2.5 | 0.2 | 1:2 | −3 | Chitosan | 99 | 100 |
| Example 11 | 2.5 | 0.3 | 1:2 | −16 | Chitosan | 101 | 100 |
| Example 12 | 2.5 | 0.3 | 1:3 | 9 | Chitosan | 101 | 100 |
| Comparative Example 8 | 2.5 | 0.3 | 1:4 | 35 | Chitosan | 91 | 99 |
| Example 13 | 2.5 | 0.6 | 1:2 | −14 | Chitosan | 101 | 100 |
| Example 14 | 2.5 | 0.6 | 1:3 | 9 | Chitosan | 100 | 100 |
| Comparative Example 9 | 2.5 | 0.8 | 1:4 | 34 | Chitosan | 91 | 97 |
| Example 15 | 2.5 | 1.0 | 1:2 | −50 | Chitosan | 99 | 100 |

TABLE 2-continued

| | Positive composite density (g/cm³) | Thickness of undercoat layer (μm) | Conductive agent:Binder (mass ratio) | Rate of increase in sheet resistance | Type of binder in undercoat layer | Power after deterioration Percentage (%) with respect to Example 1 | |
|---|---|---|---|---|---|---|---|
| | | | | | | at one second | at 10 seconds |
| Example 16 | 2.5 | 1.5 | 1:2 | −22 | Chitosan | 98 | 100 |
| Example 17 | 2.5 | 1.5 | 1:3 | 5 | Chitosan | 98 | 100 |
| Example 18 | 2.5 | 1.5 | 1:4 | 30 | Chitosan | 95 | 99 |
| Example 19 | 2.5 | 2.0 | 1:2 | 5 | Chitosan | 98 | 99 |
| Example 20 | 2.5 | 3.0 | 1:2 | 15 | Chitosan | 96 | 98 |
| Comparative Example 10 | 2.5 | 3.0 | 1:3 | 35 | Chitosan | 92 | 98 |
| Comparative Example 11 | 2.5 | 3.0 | 1:4 | 40 | Chitosan | 90 | 98 |
| Comparative Example 12 | 2.5 | 4.0 | 1:2 | 35 | Chitosan | 91 | 97 |
| Comparative Example 13 | 2.5 | 5.0 | 1:2 | 45 | Chitosan | 90 | 96 |

Figure 5A:
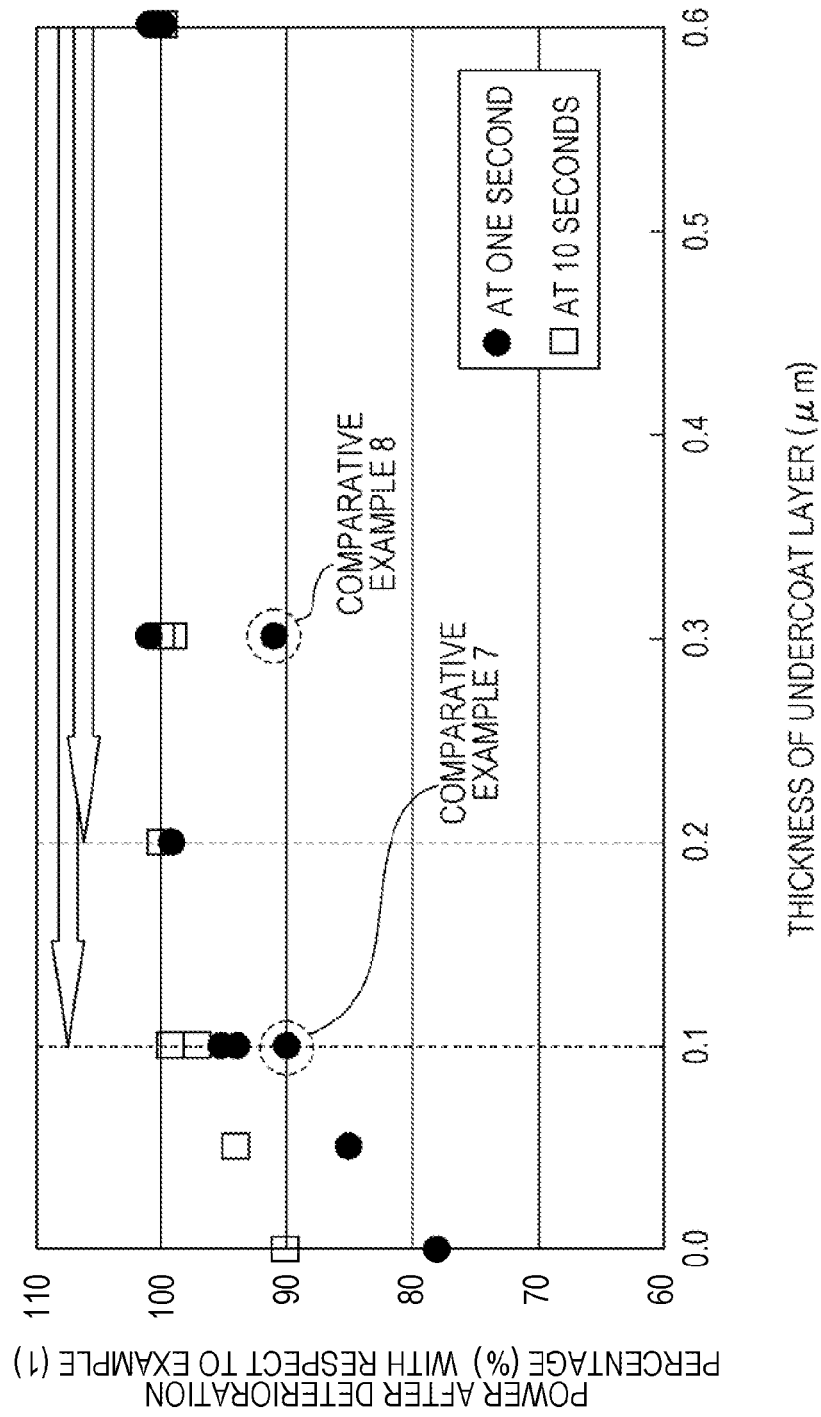
FIG. 5A is a view showing a power after deterioration in varying a thickness of an undercoat layer.
Figure 5B:
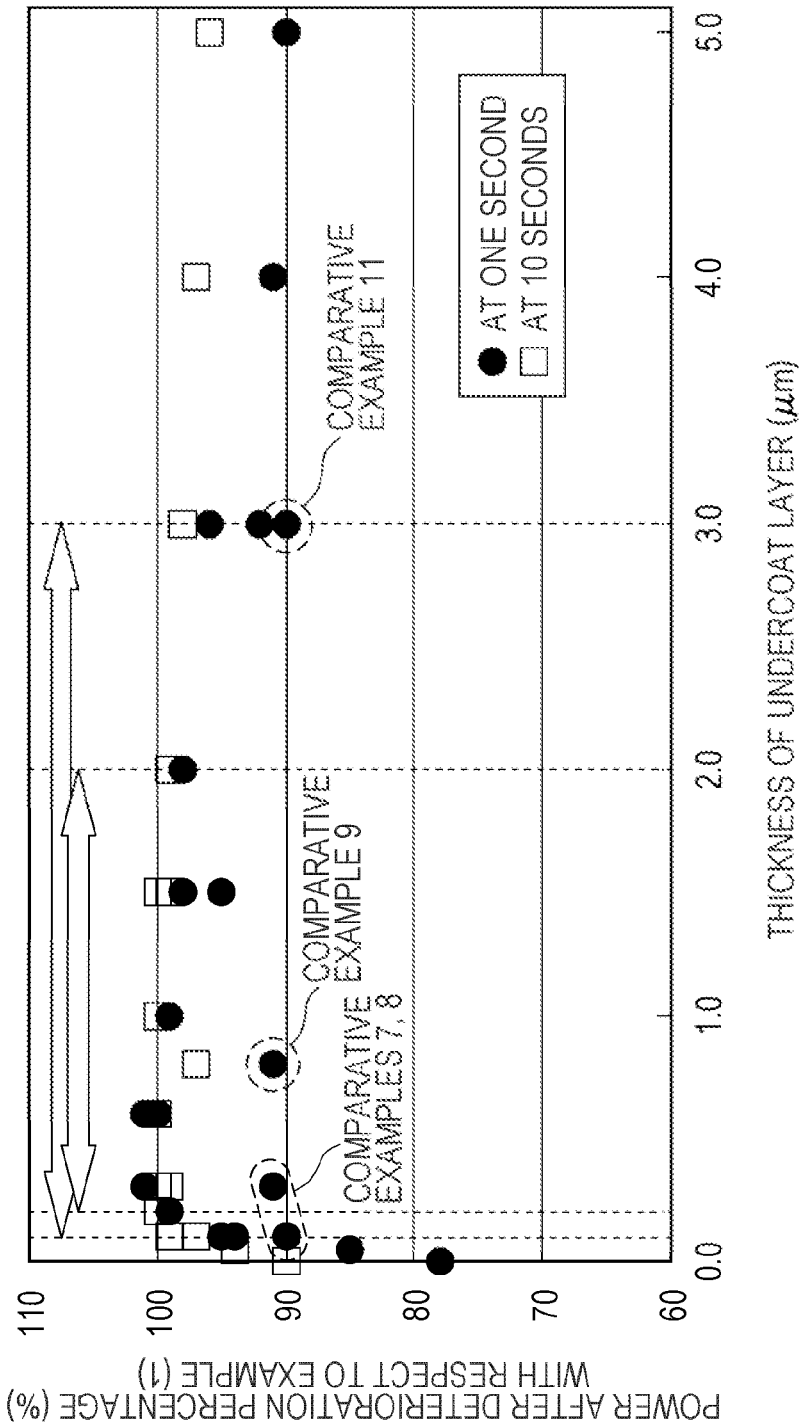
FIG. 5B is a view showing a power after deterioration in varying a thickness of an undercoat layer.

Further, FIG. 5A and FIG. 5B are a view showing the power (at one second and at ten seconds) after deterioration in varying the thickness of the undercoat layer. Specifically, each of these drawings is a graph with "Power after deterioration (at one second)" and "Power after deterioration (at 10 seconds)" in Table 2 (both represented by a percentage (%) with respect to Example 1) on the vertical-axis and "Thickness of undercoat layer" on the horizontal-axis different in scale.

As shown in Table 2, FIG. 5A and FIG. 5B described above, when the thickness of the undercoat layer is 0.1 μm or more and 3.0 μm or less, a reduction of the power (at one second and at ten seconds) after deterioration can be suppressed or the power after deterioration can be improved, and therefore a reduction of a power retention can be suppressed or the power retention can be improved. When the thickness of the undercoat layer is 0.2 μm or more and 2.0 μm or less, a reduction of the power (at one second and at ten seconds) after deterioration can be further suppressed or the power after deterioration can be further improved, and therefore a reduction of a power retention can be further suppressed or the power retention can be further improved.

Therefore, in the present embodiment, the thickness of the undercoat layer 412 is preferably 0.1 μm or more and 3.0 μm or less, and more preferably 0.2 μm or more and 2.0 μm or less.

Further, as shown in Table 2. FIG. 5A and FIG. 5B described above, in Comparative Examples 7 to 9 and 11, the power (particularly, at one second) after deterioration is reduced. That is, when the mass of the binder of the undercoat layer is two or more times and three or less times larger than the mass of the conductive agent, a reduction of the power (particularly, at one second) after deterioration can be suppressed or the power after deterioration can be improved, and therefore a reduction of a power retention can be suppressed or the power retention can be improved.

Therefore, in the present embodiment, the mass of the binder of the undercoat layer 412 is preferably two or more times and three or less times larger than the mass of the conductive agent.

Figure 6:
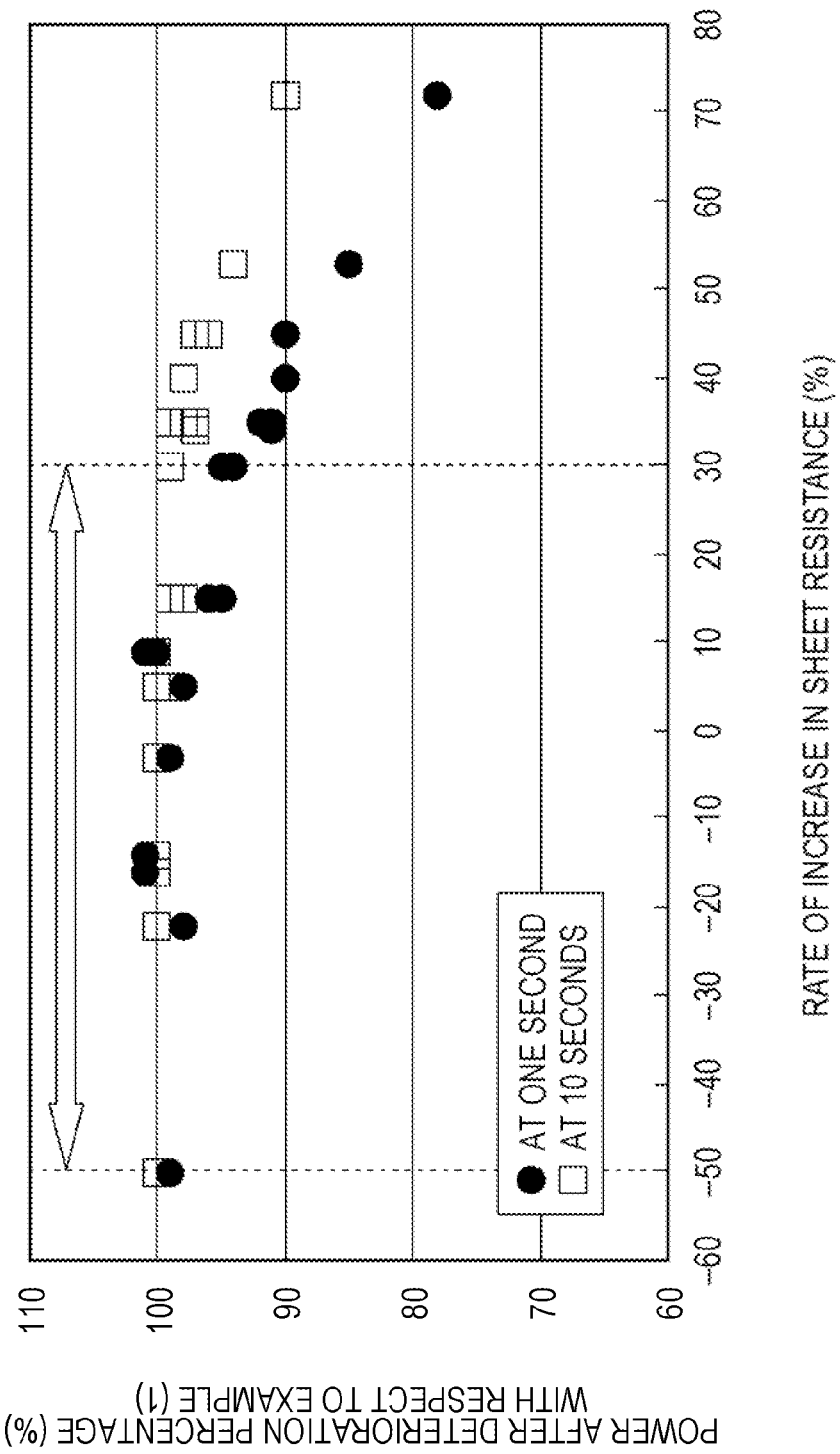
FIG. 6 is a view showing a power after deterioration in varying rate of increase in sheet resistance.

Further, FIG. 6 is a view showing the power (at one second and at ten seconds) after deterioration in varying the rate of increase in the sheet resistance. Specifically, FIG. 6 is a graph with "Power after deterioration (at one second)" and "Power after deterioration (at a10 seconds)" in Table 2 (both represented by a percentage (%) with respect to Example 1) on the vertical-axis and "Rate of increase in sheet resistance" on the horizontal-axis.

As shown in Table 2 and FIG. 6 described above, a reduction of the power (at one second and at 10 seconds) after deterioration can be suppressed or the power after deterioration can be improved when the rate of increase in sheet resistance after a solvent immersion test of the positive electrode is 30% or less.

Herein, the rate of increase in sheet resistance after a solvent immersion test of the positive electrode is an increase rate of a percentage of the sheet resistance after a solvent immersion test of the positive electrode to the sheet resistance before a solvent immersion test of the positive electrode, and it is a value obtained by subtracting 100 from the percentage.

Further, a reduction of the power (at one second and at 10 seconds) after deterioration can be further suppressed or the power after deterioration can be further improved when the rate of increase in sheet resistance after a solvent immersion test of the positive electrode is −50% or more. Thereby, a reduction of a power retention can be suppressed or the power retention can be improved.

Therefore, in the present embodiment, the rate of increase in sheet resistance after a solvent immersion test of the positive electrode 410 is 30% or less, and preferably −50% or more.

Next, Examples 21 to 33 and Comparative Examples 14 to 26 will be described by using Table 3 below. As shown in Table 3 below, Examples 21 to 33 and Comparative Examples 14 to 26 show the powers (at one second and at ten seconds) after deterioration of batteries in fixing the positive composite density and the thickness of the undercoat layer and, and in varying the mass ratio of the conductive agent to the binder, rate of increase in sheet resistance, and the type of binder in the undercoat layer.

TABLE 3

| | Positive composite density (g/cm³) | Thickness of undercoat layer (μm) | Conductive agent:Binder (mass ratio) | Rate of increase in sheet resistance | Type of binder in undercoat layer | Drying temperature (° C.) | Power after deterioration Percentage (%) with respect to Example 1 | |
|---|---|---|---|---|---|---|---|---|
| | | | | | | | at one second | at 10 seconds |
| Comparative Example 14 | 2.5 | 0.5 | 1:2 | 51 | Chitosan (dried 80° C.) | 80 | 88 | 95 |
| Comparative Example 15 | 2.5 | 0.5 | 1:2 | 46 | Chitosan (dried 100° C.) | 100 | 90 | 98 |
| Comparative Example 16 | 2.5 | 0.5 | 1:2 | 41 | Chitosan (dried 120° C.) | 120 | 92 | 99 |
| Example 21 | 2.5 | 0.5 | 1:2 | 14 | Chitosan (dried 140° C.) | 140 | 96 | 99 |
| Example 22 | 2.5 | 0.5 | 1:2 | −4 | Chitosan (dried 160° C.) | 160 | 101 | 100 |
| Example 23 | 2.5 | 0.5 | 1:1 | 25 | Chitosan | 100 | 96 | 98 |
| Example 24 | 2.5 | 0.5 | 2:1 | 10 | Chitosan | 100 | 98 | 99 |
| Example 25 | 2.5 | 0.5 | 1:2 | 3 | Cellulose | 120 | 99 | 99 |
| Example 26 | 2.5 | 0.5 | 1:2 | 15 | Cellulose | 80 | 98 | 99 |
| Comparative Example 17 | 2.5 | 0.5 | 1:2 | 38 | Cellulose | 25 | 91 | 97 |
| Example 27 | 2.5 | 0.5 | 1:1 | −1 | Cellulose | 120 | 100 | 99 |
| Example 28 | 2.5 | 0.5 | 1:1 | 7 | Cellulose | 80 | 99 | 99 |
| Example 29 | 2.5 | 0.5 | 1:1 | 25 | Cellulose | 25 | 96 | 98 |
| Example 30 | 2.5 | 0.5 | 2:1 | −2 | Cellulose | 120 | 101 | 99 |
| Example 31 | 2.5 | 0.5 | 2:1 | 1 | Cellulose | 80 | 100 | 100 |
| Example 32 | 2.5 | 0.5 | 2:1 | 2 | Cellulose | 25 | 99 | 99 |
| Comparative Example 18 | 2.5 | 0.5 | 1:2 | 80 | Acrylic acid | — | 75 | 87 |
| Comparative Example 19 | 2.5 | 0.5 | 1:1 | 40 | Acrylic acid | — | 90 | 95 |
| Example 33 | 2.5 | 0.5 | 2:1 | 15 | Acrylic acid | — | 98 | 99 |
| Comparative Example 20 | 2.5 | 0.5 | 1:2 | 60 | PVDF (#9130) | 80 | 80 | 89 |
| Comparative Example 21 | 2.5 | 0.5 | 1:2 | 51 | PVDF (#9130) | 100 | 83 | 90 |
| Comparative Example 22 | 2.5 | 0.5 | 1:2 | 40 | PVDF (#9130) | 120 | 88 | 94 |
| Comparative Example 23 | 2.5 | 0.5 | 1:2 | 25 | PVDF (#9130) | 140 | 92 | 98 |
| Comparative Example 24 | 2.5 | 0.5 | 1:2 | 22 | PVDF (#9130) | 150 | 92 | 98 |
| Comparative Example 25 | 2.5 | 0.5 | 1:2 | 23 | PVDF (#9130) | 160 | 92 | 98 |
| Comparative Example 26 | 2.5 | 0.5 | 1:2 | 40 | PVDF (#1120) | 140 | 86 | 94 |

Figure 7:
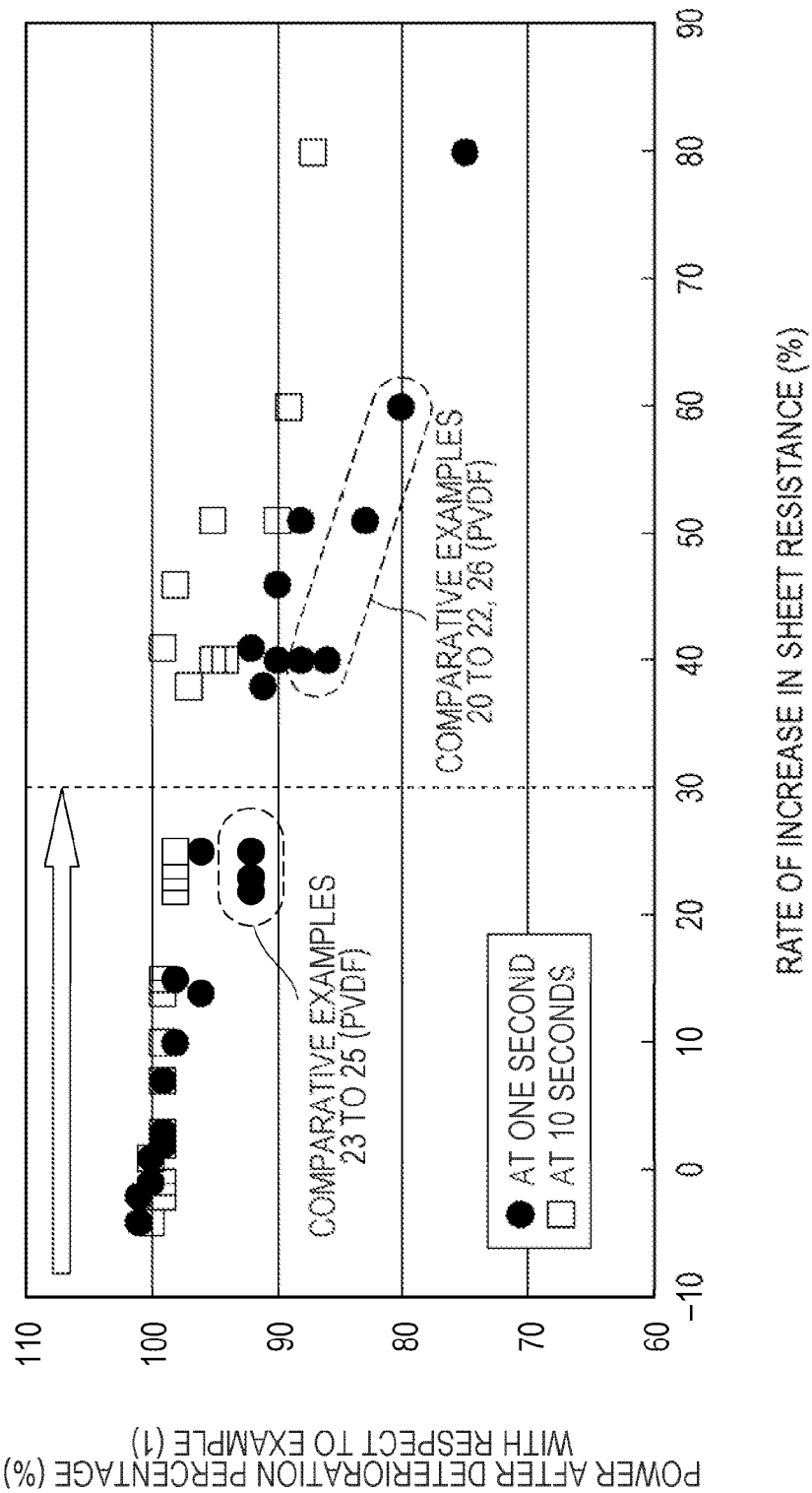
FIG. 7 is a view showing a power after deterioration in varying rate of increase in sheet resistance.

Further, FIG. 7 is a view showing the power (at one second and at ten seconds) after deterioration in varying the rate of increase in the sheet resistance. Specifically FIG. 7 is a graph with "Power after deterioration (at one second)" and "Power after deterioration (at a10 seconds)" in Table 3 (both represented by a percentage (%) with respect to Example 1)

on the vertical-axis and "Rate of increase in sheet resistance" on the horizontal-axis.

As shown in Table 3 and FIG. 7 described above, as with Table 2 and FIG. 6 described above, a reduction of the power (at one second and at 10 seconds) after deterioration can be suppressed or the power after deterioration can be improved when the rate of increase in sheet resistance after a solvent immersion test of the positive electrode is 30% or less and the undercoat layer includes a binder selected from the group consisting of chitosan derivatives, cellulose derivatives and acrylic acid derivatives.

Further, as shown in Table 3 and FIG. 7 described above, the power (particularly, at one second) after deterioration is reduced when the binder of the undercoat layer does not contain chitosan derivatives, cellulose derivatives or acrylic acid derivatives (Comparative Examples 20 to 26, in which poly vinylidene fluoride (PVDF) is contained). That is, when the binder of the undercoat layer contains chitosan derivatives, cellulose derivatives or acrylic acid derivatives, a reduction of the power (particularly, at one second) after deterioration can be suppressed or the power after deterioration can be improved, and therefore a reduction of a power retention can be suppressed or the power retention can be improved.

Additionally, when the binder contains chitosan derivatives, cellulose derivatives or acrylic acid derivatives, a reduction of the power (at one second and 10 seconds) after deterioration can be suppressed or the power after deterioration can be improved as long as the rate of increase in sheet resistance after a solvent immersion test is 30% or less, regardless of mass ratio of the conductive agent to the binder.

In the present embodiment, the binder of the undercoat layer 412 preferably contains at least one selected from among chitosan derivatives, cellulose derivatives and acrylic acid derivatives.

Next, Comparative Examples 27 to 37 will be described by using Table 4 below. As shown in Table 4 below, Comparative Examples 27 to 37 show the powers (at one second and at ten seconds) after deterioration of batteries in varying the positive composite density and the rate of increase in the sheet resistance in batteries not having the undercoat layer.

TABLE 4

| | Positive composite density ($g/cm^3$) | Rate of increase in sheet resistance | Power after deterioration Percentage (%) with respect to Example 1 (%) | |
|---|---|---|---|---|
| | | | at one second | at 10 seconds |
| Comparative Example 27 | 2.5 | 72 | 78 | 85 |
| Comparative Example 28 | 1.9 | 105 | 70 | 71 |
| Comparative Example 29 | 2.0 | 95 | 71 | 73 |
| Comparative Example 30 | 2.1 | 95 | 73 | 75 |
| Comparative Example 31 | 2.2 | 80 | 74 | 80 |
| Comparative Example 32 | 2.3 | 75 | 75 | 82 |
| Comparative Example 33 | 2.4 | 70 | 77 | 83 |
| Comparative Example 34 | 2.6 | 50 | 85 | 90 |
| Comparative Example 35 | 2.7 | 45 | 88 | 77 |
| Comparative Example 36 | 2.8 | 35 | 90 | 74 |
| Comparative Example 37 | 3.0 | 25 | 94 | 69 |

Figure 8:
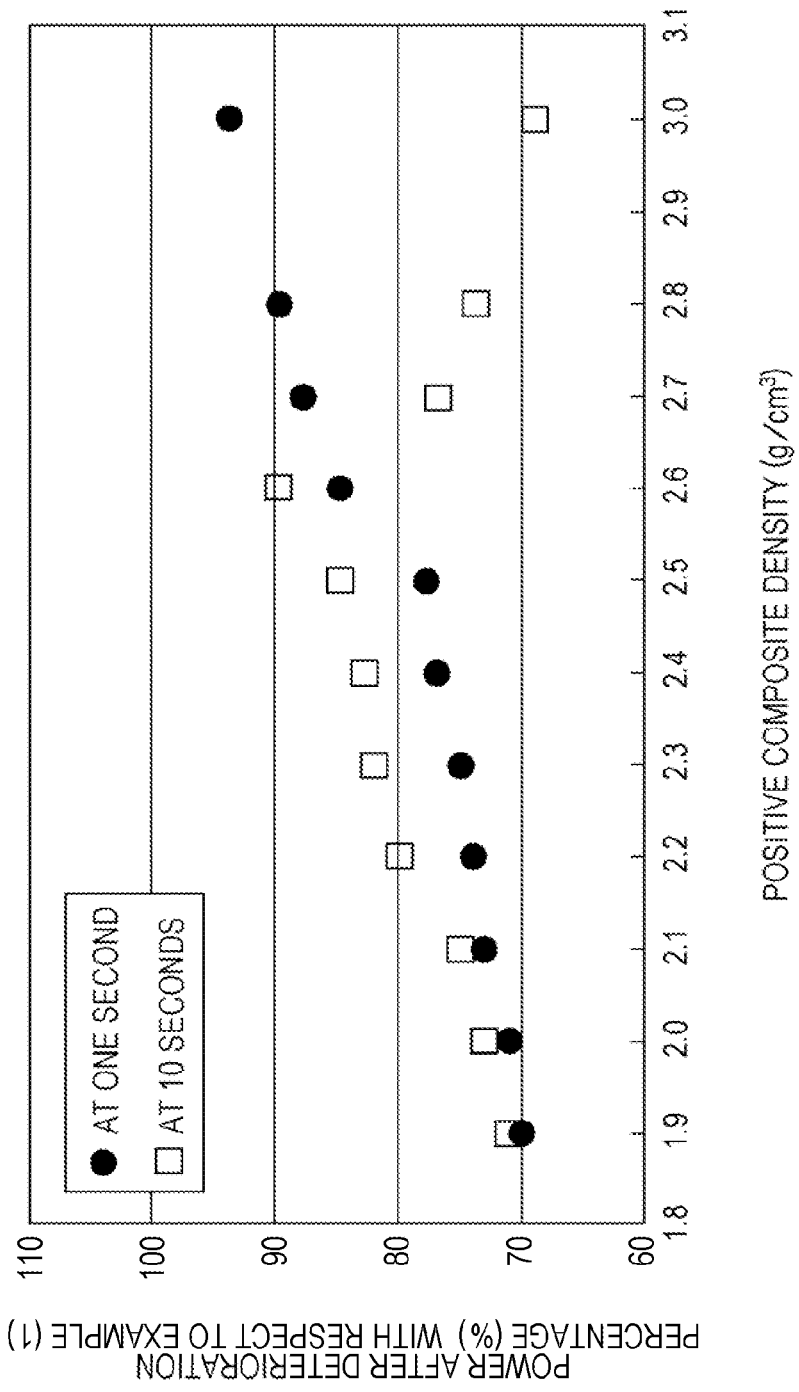
FIG. 8 is a view showing a power after deterioration in varying a positive composite density in a structure of not having an undercoat layer.

Further, FIG. 8 is a view showing the power (at one second and at ten seconds) after deterioration in varying the positive composite density in a structure of not having the undercoat layer. Specifically, FIG. 8 is a graph with "Power after deterioration (at one second)" and "Power after deterioration (at a10 seconds)" in Table 4 (both represented by a percentage (%) with respect to Example 1) on the vertical-axis and "Positive composite density" on the horizontal-axis.

As shown in Table 4 and FIG. 8 described above, in batteries not having the undercoat layer, the powers (particularly at one second) after deterioration were reduced compared with the batteries having the undercoat layer shown in Table 1 and FIG. 4. That is, when the undercoat layer is located between the positive substrate layer and the positive composite layer, a reduction of the power (particularly, at one second) after deterioration can be suppressed or the power after deterioration can be improved, and therefore a reduction of a power retention can be suppressed or the power retention can be improved.

Therefore, in the present embodiment, the undercoat layer 412 is located between the positive substrate layer 411 and the positive composite layer 413.

As described above, according to the electric storage device 10 of the embodiment of the present invention, in the electric storage device 10 in which the undercoat layer 412 is arranged in the positive electrode 410, the density of the positive composite layer 413 is 2.1 $g/cm^3$ or more and 2.7 $g/cm^3$ or less, the positive electrode 410 has the rate of increase in sheet resistance after a solvent immersion test of 30% or less, and the undercoat layer contains at least one selected from among chitosan derivatives, cellulose derivatives and acrylic acid derivatives. Herein, the present inventors found as the results of earnest investigations and experiments that in the case of arranging the undercoat layer 412 in the positive electrode 410, a reduction of a power retention can be suppressed or a power retention can be improved when the density of the positive composite layer 413, the rate of increase in sheet resistance after a solvent immersion test of the positive electrode 410 are within the above-mentioned ranges, and the undercoat layer contains at least one selected from among chitosan derivatives, cellulose derivatives and acrylic acid derivatives.

That is, even when the density of the positive composite layer 413 is increased by pressing in order to improve current collecting resistance between the positive composite layer 413 and the positive substrate layer 411, if the binder at the interface between the positive composite layer 413 and the positive substrate layer 411 swells due to an electrolyte solution and thereby, resistance of the interface increases, the power retention is reduced. Therefore, the present inventors found as the results of earnest investigations and experiments that when the rate of increase in sheet resistance after a solvent immersion test of the positive electrode 410 is 30% or less and the undercoat layer contains at least one selected from among chitosan derivatives, cellulose derivatives and acrylic acid derivatives, an increase of resistance of the interface can be suppressed and in this case, an appropriate range of a density of the positive composite layer 413 is 2.1 g/cm³ or more and 2.7 g/cm³ or less.

Specifically, when the binder at the interface between the positive composite layer 413 and the positive substrate layer 411 swells due to an electrolyte solution, resistance of the interface increases to reduce the power retention (power after deterioration at one second after being left at a high-temperature and at high SOC): however, a reduction of the power retention could be suppressed or the power retention could be improved by keeping, below 30%, the rate of increase in sheet resistance after a solvent immersion test of the positive electrode 410, and by using a binder selected from among chitosan derivatives, cellulose derivatives and acrylic acid derivatives in the undercoat layer. Further, when the binder within the positive composite layer 413 swells due to an electrolyte solution, diffusion of ions is inhibited to reduce the power retention (power after deterioration at ten seconds after being left at a high-temperature and at high SOC); however, a reduction of the power retention could be suppressed or the power retention could be improved by setting the density of the positive composite layer 413 within the definite range of 2.1 g/cm³ or more and 2.7 g/cm³ or less to suppress the inhibition of diffusion of ions.

Thereby, in the electric storage device 10 in which the undercoat layer 412 is arranged on the positive electrode 410, by setting the density of the positive composite layer 413 and the rate of increase in sheet resistance after a solvent immersion test of the positive electrode 410 within the ranges described above and by using a binder selected from among chitosan derivatives, cellulose derivatives and acrylic acid derivatives in the undercoat layer, the power can be increased through suppression of a reduction of power retention or an improvement of power retention.

Further, the present inventors found as the results of earnest investigations and experiments that a reduction of a power retention can be further suppressed or a power retention can be further improved when the density of the positive composite layer 413 is 2.2 g/cm³ or more and 2.6 g/cm³ or less (preferably 2.3 g/cm³ or more and 2.5 g/cm³ or less). Therefore, in the electric storage device 10 in which the undercoat layer 412 is arranged on the positive electrode 410, the power can be further increased by setting the density of the positive composite layer 413 to 2.2 g/cm³ or more and 2.6 g/cm³ or less (preferably 2.3 g/cm³ or more and 2.5 g/cm³ or less).

Further, the present inventors found as the results of earnest investigations and experiments that a reduction of a power retention can be suppressed or a power retention can be improved when the rate of increase in sheet resistance after a solvent immersion test of the positive electrode 410 is −50% or more. Therefore, in the electric storage device 10 in which the undercoat layer 412 is arranged on the positive electrode 410, the power can be increased by setting the rate of increase in sheet resistance after a solvent immersion test of the positive electrode 410 to −50% or more.

Further, the present inventors found as the results of earnest investigations and experiments that a reduction of a power retention can be suppressed or a power retention can be improved when the thickness of the undercoat layer 412 is 0.1 µm or more and 3.0 µm or less. Therefore, in the electric storage device 10 in which the undercoat layer 412 is arranged on the positive electrode 410, the power can be increased by setting the thickness of the undercoat layer 412 to 0.1 µm or more and 3.0 µm or less.

Further, the present inventors found as the results of earnest investigations and experiments that a reduction of a power retention can be further suppressed or a power retention can be further improved when the thickness of the undercoat layer 412 is 0.2 µm or more and 2.0 µm or less. Therefore, in the electric storage device 10 in which the undercoat layer 412 is arranged on the positive electrode 410, the power can be further increased by setting the thickness of the undercoat layer 412 to 0.2 µm or more and 2.0 µm or less.

Further, the present inventors found as the results of earnest investigations and experiments that a reduction of a power retention can be suppressed or a power retention can be improved when in the undercoat layer 412, a mass of the binder is two or more times and three or less times larger than a mass of the conductive agent. Therefore, in the electric storage device 10 in which the undercoat layer 412 is arranged on the positive electrode 410, the power can be increased by adjusting the mass of the binder of the undercoat layer 412 to two-fold or more and three-fold or less of the mass of the conductive agent.

Further, the present inventors found as the results of earnest investigations and experiments that a reduction of a power retention can be suppressed or a power retention can be improved in an electric storage device 10 having a positive active material containing the above-mentioned lithium transition metal oxide represented by $Li_aNi_bM1_cM2_dW_xNb_yZr_zO_2$. Therefore, the power can be increased in the electric storage device 10 having a positive active material containing the lithium transition metal oxide.

Further, the present inventors found as the results of earnest investigations and experiments that a reduction of a power retention can be suppressed or a power retention can be improved in an electric storage device 10 containing hardly-graphitizable carbon as the negative active material. Therefore, the power can be increased in the electric storage device 10 having a negative active material containing the hardly-graphitizable carbon.

As described above, the electric storage device 10 of the embodiment of the present invention has been described; however, the present invention is not limited to the embodiment.

That is, the embodiments disclosed herein are intended to illustrate the invention in all respects and are not to be construed to limit the invention. The scope of the present invention is defined by the appended claims rather than by the above-mentioned descriptions, and all modifications and variations which fall within the scope of the claims, or equivalence of the scope of the claims are therefore intended to be embraced by the claims.

The present invention can be applied to an electric storage device which can increase a power in the configuration in which the undercoat layer is arranged on the positive electrode.

The present invention can increase a power in the electric storage device in which the undercoat layer is arranged on the positive electrode.

What is claimed is:

1. An electric storage device having a positive electrode, a negative electrode, a separator located between the positive electrode and the negative electrode, and a nonaqueous electrolyte,
   wherein the positive electrode has a positive substrate layer,
   a positive composite layer containing a positive active material and an undercoat layer located between the positive substrate layer and the positive composite layer,
   a density of the positive composite layer is 2.1 g/cm³ or more and 2.7 g/cm³ or less,
   the positive electrode has a rate of increase in sheet resistance after a solvent immersion test of 30% or less, and the undercoat layer contains a binder selected from the group consisting of chitosan derivatives, cellulose derivatives and acrylic acid derivatives;

wherein the positive active material has a compound represented by $Li_aNi_bM1_cM2_dW_xNb_yZr_zO_2$, (in the formula, a, b, c, d, x, y, and z satisfy the $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$, b+c+d=1, and M1 and M2 are respectively at least one element selected from the group consisting of Mn, Ti, Cr, Fe, Co, Cu, Zn, Al, Ge, Sn and Mg).

2. The electric storage device according to claim 1, wherein a density of the positive composite layer is 2.2 g/cm³ or more and 2.6 g/cm³ or less.

3. The electric storage device according to claim 1, wherein the positive electrode has the rate of increase in sheet resistance after a solvent immersion test of −50% or more.

4. The electric storage device according to claim 1, wherein the undercoat layer has a thickness of 0.1 μm or more and 3.0 μm or less.

5. The electric storage device according to claim 4, wherein the undercoat layer has a thickness of 0.2 μm or more and 2.0 μm or less.

6. The electric storage device according to claim 1, the undercoat layer further including a conductive agent, wherein a mass of the binder is two or more times and three or less times larger than a mass of the conductive agent.

7. The electric storage device according to claim 1, wherein the negative electrode contains hardly-graphitizable carbon as a negative active material.

* * * * *